UNITED STATES PATENT OFFICE.

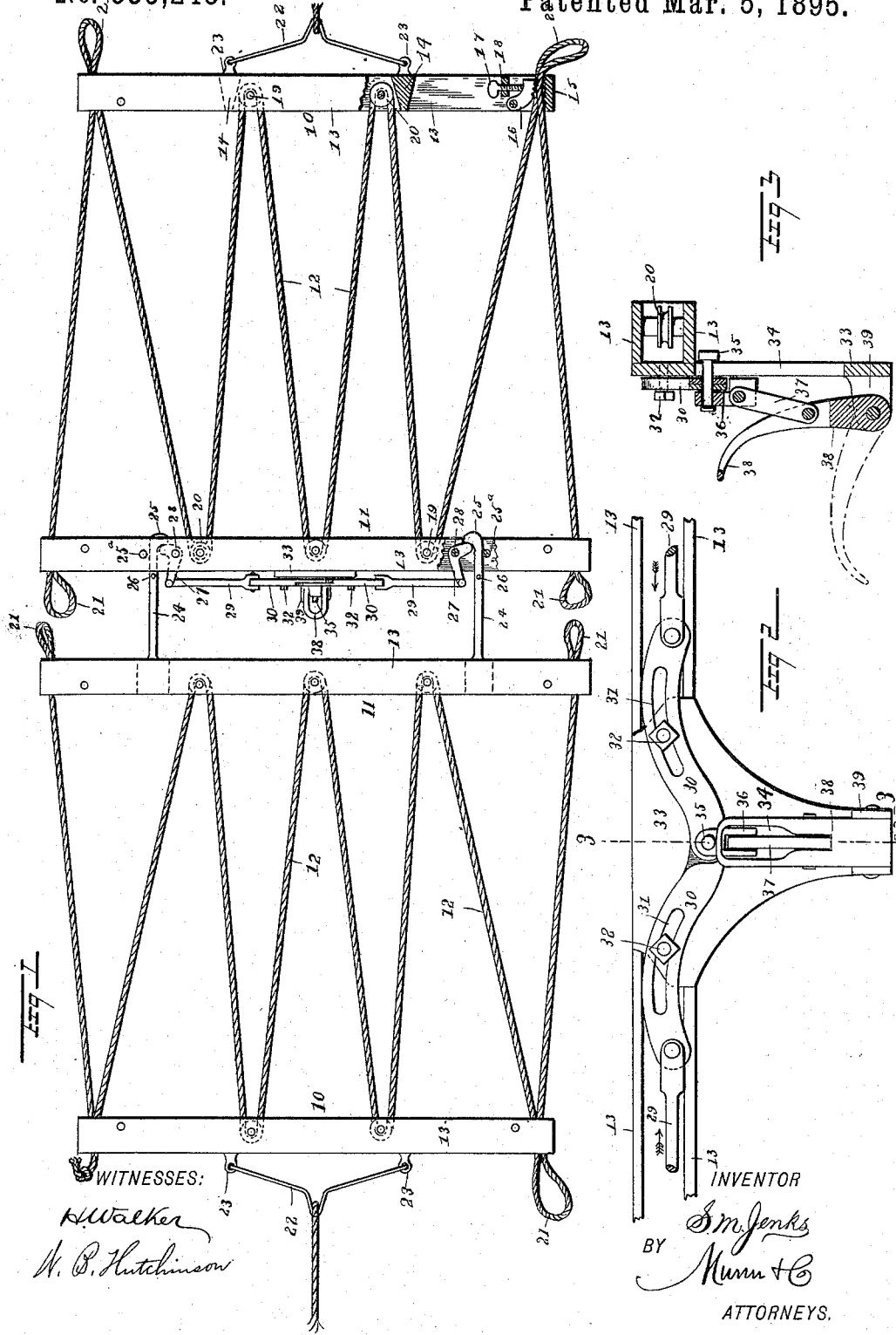

SAMUEL M. JENKS, OF MADISON, SOUTH DAKOTA.

HAY-SLING.

SPECIFICATION forming part of Letters Patent No. 535,248, dated March 5, 1895.

Application filed July 30, 1894. Serial No. 519,029. (No model.)

*To all whom it may concern:*

Be it known that I, SAMUEL M. JENKS, of Madison, in the county of Lake and State of South Dakota, have invented a new and Improved Hay-Sling, of which the following is a full, clear, and exact description.

My invention relates to improvements in hay slings; and the object of my invention is to produce a hay sling which may be used as a substitute for a hay fork or other carrier in handling hay, straw or analogous material, and to produce a sling which may be made to carry any amount of hay or other material within reasonable limits, which binds the same so firmly that there is no scattering or dribbling of the hay, which may be easily adjusted to carry desired amounts, which may be instantly tripped so as to deposit its load, which leaves the load in excellent condition for pitching, which may be used to great advantage in loading and unloading hay, and which may also be used to advantage in stacking.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a broken plan view of my improved sling showing it stretched open ready to receive its load. Fig. 2 is an enlarged detail view of the tripping mechanism; and Fig. 3 is a cross section on the line 3—3 of Fig. 2.

The sling is provided with two end heads or baling heads 10 which are adapted to be drawn up over the load of hay to be carried, and with two center or tripping heads 11 which are attached together in such a manner that they may be instantly and easily separated to dump the load, as hereinafter described; the two heads 10 and 11 of each half of the cylinder being connected by a cord 12, as hereinafter specified, although other suitable netting may be substituted for the cord if desired. Each head is made up of two parallel bars 13 and castings 14 held between the bars, so as to give them the necessary rigidity, while at the ends of the bars are corrugated castings 15 opposite which are corrugated dogs 16 which are pivoted between the bars, as shown in Fig. 1, and are pressed toward the castings 15 by thumb screws 17 which turn in suitable bearings 18, and thus, by the simple manipulation of the thumb screws 17 the dogs may be tightened or loosened on the cord 12 and the length of the latter regulated, so as to regulate the capacity of the sling.

The cord 12 passes back and forth, from head to head, over pulleys 20 which are held between the bars, although pins may be substituted for the pulleys with the same effect, but with greater friction on the cord. When the cord is bound in place it is allowed to protrude in the form of a loop on the ends of the several heads, as shown at 21, in Fig. 1, and thus the heads may be easily adjusted on the cord so as to govern the capacity of the same. The end heads or baling heads 10 are provided with bails 22 to engage a hoisting rope or other device, and these bails are secured to lugs 23 which project from the castings 14 of the heads, as shown in Fig. 1.

The two tripping heads 11 are connected by the tripping arms or hooks 24 which terminate in hooked heads 25, and these arms are rigidly attached to one head 11 and are adapted to enter the opposing one, as shown clearly in Fig. 1, the arms being prevented from passing too far into the said opposing head by pins 26 which project laterally from the arms. The arms 24 enter one of the tripping heads 11, as shown in Fig. 1, and are backed by pins 25ª to prevent their displacement, and the hooked heads 25 are engaged by dogs 27, of a bell crank shape, which are pivoted in the head 11, as shown at 28, and the elbow dogs or bell cranks have their protruding ends connected, by rods 29, with the slotted levers 30 which have curved slots 31 to receive the lugs 32 by which they are in part held and guided on the bed plate 33, which is secured centrally to and depends from one of the trip heads 11, as shown clearly in Figs. 2 and 3, and this bed plate is vertically slotted in the center, as shown at 34, to receive the guide pin 35, which assists in holding the slotted levers or arms 30 in place, and which forms a pivotal connection between the said levers and the cross head 36, which is adapted to slide up and down on the bed plate and connects, by a link 37, with the tripping lever 38, this being fulcrumed in brackets 39 at the lower end of the bed plate 33.

It will be seen that when the tripping lever 38 is tipped into a position substantially parallel with the bed plate 33, as in Fig. 3, the link 37 will throw the cross head 36, and the inner end of the levers 30, upward, and thus move the connecting rods 29 outward, the levers 30 turning and sliding on the lugs 32, and this movement of the connecting rods tilts the elbow dogs 27 so that they hold the arms 24 locked in place, but if the sling is carrying a load and it is desired to dump the load, the lever 38 is thrown down, thus reversing the above movements and tilting the dogs 27 so as to permit the arms 24 to be withdrawn, and the sling is thus parted in the middle and the load dropped without being tangled, and, therefore, in good condition to be pitched.

In loading the sling the latter is first straightened out, as in Fig. 1, the hay or other material piled upon it, and the hoisting rope is preferably passed through one bail 22 and made fast by a hook or other contrivance to the other bail, and thus when a hoisting strain is applied the two heads 10 are drawn together, binding the hay firmly in the sling. Prior to using the sling, a rope is attached to the lever 38 so that it may be easily pulled down, and when the load is to be dumped the lever is pulled down, thus tilting the dogs 27, as specified, and permitting the withdrawal of the arms 24.

It will be readily seen that this apparatus may be used instead of a hay fork or hay carrier for handling hay in many ways, and several of these slings may be arranged on a rack, so that the whole load may be conveniently carried and easily unloaded. When this is done one sling is spread on the rack bottom and suitably fastened, the desired amount of hay is loaded on this, another sling is spread on the hay and a second batch of hay placed on the second sling, &c., and then when the hay is unloaded the slings, with their separate loads of hay are lifted one by one from the rack and dumped as specified.

As previously remarked, the body of the sling is preferably made of a netting formed of the cord 12, passing in a zigzag direction between the heads, but the body may be formed by a netting or any other suitable material without departing from the principle of my invention.

Having thus described my invention, I claim as new and desire to secure by Letters Patent—

1. A hay sling comprising two sections, each formed of parallel inner and outer heads 11—10, said heads consisting in parallel bars 13 having spacing lugs or projections 14 between them, rollers 20 journaled between the bars, the outer heads being provided at one end with a fixed jaw 15, a pivoted dog 16, and a set screw engaging the pivoted jaw, ropes rove back and forth around said rollers, and each having a bight 21 clamped by said jaws, and means for locking and releasing the inner heads, substantially as described.

2. A hay sling, comprising end bailing heads, center or tripping heads, a cord arranged to form a netting and adjustably connecting the center heads with the end or bailing heads, arms secured to one of the center heads and adapted to enter the other, dogs pivoted in one of the center heads and adapted to engage the arms, swinging and sliding levers held on the center head and connected by rods with the dogs, and a second lever for working the sliding levers, substantially as described.

3. In a hay sling, the combination of the two separable tripping or center heads, one having projecting arms with heads thereon and the other having dogs to engage the heads of the arms, a bed plate, levers held to swing and slide on the bed plate, a second lever for working the swinging and sliding levers, and connecting rods extending from the swinging and sliding levers to the dogs, substantially as described.

SAMUEL M. JENKS.

Witnesses:
D. D. HOLDRIDGE,
G. L. MCALLISTER.